(12) United States Patent
Meyer et al.

(10) Patent No.: US 8,404,774 B2
(45) Date of Patent: Mar. 26, 2013

(54) ADHESIVE AND SEALANT SYSTEMS

(75) Inventors: Juergen Meyer, Stockstadt (DE); Mario Scholz, Gruendau (DE)

(73) Assignee: Evonik Degussa GmbH, Essen (DE)

( * ) Notice: Subject to any disclaimer, the term of this patent is extended or adjusted under 35 U.S.C. 154(b) by 452 days.

(21) Appl. No.: 12/602,276

(22) PCT Filed: May 23, 2008

(86) PCT No.: PCT/EP2008/056385
§ 371 (c)(1),
(2), (4) Date: Nov. 30, 2009

(87) PCT Pub. No.: WO2008/145618
PCT Pub. Date: Dec. 4, 2008

(65) Prior Publication Data
US 2010/0179276 A1   Jul. 15, 2010

(30) Foreign Application Priority Data

May 31, 2007   (DE) .......................... 10 2007 025 435

(51) Int. Cl.
C01B 33/113 (2006.01)
C01B 33/18 (2006.01)
C09C 3/04 (2006.01)
C08K 3/36 (2006.01)
C08L 9/00 (2006.01)

(52) U.S. Cl. ........ 524/493; 423/324; 423/325; 423/335; 423/337; 524/492; 524/571; 524/847

(58) Field of Classification Search ................. 106/481, 106/490; 423/324, 325, 335, 337; 524/492, 524/493, 847, 548, 612, 589, 588, 560, 463, 524/557, 467, 575, 571, 609, 585, 582, 599, 524/594, 597, 606, 556
See application file for complete search history.

(56) References Cited

U.S. PATENT DOCUMENTS

| | | | | |
|---|---|---|---|---|
| 4,684,690 A | * | 8/1987 | Kraus et al. | 524/419 |
| 5,004,869 A | * | 4/1991 | Koblitz et al. | 174/84 C |
| 5,204,386 A | * | 4/1993 | Ersun-Hallsby et al. | 523/443 |
| 5,959,005 A | | 9/1999 | Hartmann et al. | |
| 2005/0241531 A1 | | 11/2005 | Meyer et al. | |
| 2008/0207842 A1 | | 8/2008 | Barthel et al. | |
| 2008/0300356 A1 | * | 12/2008 | Meyer et al. | 524/493 |

FOREIGN PATENT DOCUMENTS

| | | |
|---|---|---|
| DE | 10 2005 035 442 | 5/2007 |
| EP | 0 076 377 | 4/1983 |
| EP | 1 801 073 | 6/2007 |
| WO | WO 2004020531 A1 * | 3/2004 |
| WO | WO 2005/054390 A1 | 6/2005 |
| WO | 2007 071526 | 6/2007 |

OTHER PUBLICATIONS

Office Action issued Aug. 9, 2011 in Chinese Patent Application No. 200880017978.1 (English translation only).

* cited by examiner

*Primary Examiner* — Ling Choi
*Assistant Examiner* — Darcy D Laclair Lynx
(74) *Attorney, Agent, or Firm* — Oblon, Spivak, McClelland, Maier & Neustadt, L.L.P.

(57) ABSTRACT

Adhesive and sealant systems Adhesive and sealant systems on the basis of unsaturated polyester resins, epoxy resins, polyurethane, silane-terminated polymers, vinyl ester resins, acrylates, polyvinyl acetate, polyvinyl alcohol, polyvinyl ethers, ethylene-vinyl acetate, ethylene-acrylic acid copolymers, polyvinyl acetates, polystyrene, polyvinyl chloride, styrene-butadiene rubber, chloroprene rubber, nitrile rubber, butyl rubber, polysulphide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles or polysulphones and containing 1% to 15% by weight of a hydrophilic fumed silica structurally modified by grinding.

15 Claims, No Drawings

ADHESIVE AND SEALANT SYSTEMS

The invention relates to adhesive and sealant systems.

Adhesive and sealant systems are known from Ullmann's Enzyklopädie der technischen Chemie, 4th Edition, Volume 14, page 227 (1997).

They consist of high-polymer compounds having extremely good strength properties. The majority of adhesives and sealants comprise high molecular mass organic compounds as base materials, or reactive organic compounds which are precursors of polymeric compounds and react to polymers in the course of the adhesive bonding and sealing operation.

It is known that for various adhesive and sealant systems, for example those based on unsaturated polyester resins, polyurethane resins or vinyl ester resins, hydrophilic fumed silicas are very effective thixotroping agents in comparison to other silicas (Degussa Schriftenreihe Pigmente (2001) No. 27 and No. 54).

Disadvantageously, on account of their particle size distribution, fumed silicas frequently produce roughness of the adhesive and sealant surface.

This effect is a significant disadvantage. For this reason, hydrophilic fumed silica can be used only in limited adhesives and sealants. Particularly in the context of use in gelcoats, such behaviour cannot be tolerated, since the gelcoat later represents the face of a moulding's surface.

It is therefore an object to produce adhesive and sealant systems in which this disadvantage does not occur.

The invention provides adhesive and sealant systems characterized in that they contain 0.5% to 15% by weight of a hydrophilic fumed silica structurally modified by grinding.

The adhesive and sealant systems may have been obtained on the basis of unsaturated polyester resins, epoxy resins, polyurethane, silane-terminated polymers, vinyl ester resins, acrylates, polyvinyl acetate, polyvinyl alcohol, polyvinyl ethers, ethylene-vinyl acetate, ethylene-acrylic acid copolymers, polyvinyl acetates, polystyrene, polyvinyl chloride, styrene-butadiene rubber, chloroprene rubber, nitrile rubber, butyl rubber, polysulphide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles or polysulphones.

One preferred subject of the invention may be a gelcoat based on unsaturated polyester resins.

Sealants:

Non-metallic materials, both plastic and elastic, having adhesion properties and intended for filling joints and cavities between material unions, they adhere to the sides of the material after setting, and seal the joints against ambient media. Like the adhesives, the sealants may both be physically setting systems or chemically curing (crosslinking) systems. Besides the base polymer, sealants may comprise further constituents, such as, for example, plasticizers, solvents (ketones for example), water, fillers (chalk for example), thixotroping agents (fumed silica for example), adhesion promoters (silanes for example), colour pastes (pigment-grade carbon black for example) and also further additives (for example catalysts, ageing inhibitors).

Adhesives:

Non-metallic substances which are able to join adherends by two-dimensional attachment and internal strength (adhesion and cohesion). Adhesives can be products which, in accordance with their respective chemical composition and the physical state prevailing at the time of application to the adherends, allow wetting of the surfaces and, in their bonded joint, form the adhesive layer needed for transmission of force between the adherends.

Like the sealants, adhesives may comprise further components as well as the base polymer, such as, for example, solvents (ketones for example), water, fillers (chalk for example), thixotroping agents (fumed silica for example), adhesion promoters (silanes for example), colour pastes (pigment-grade carbon black for example) and also further additives (for example catalysts, ageing inhibitors).

In comparison to sealants, adhesives may have higher tensile shear strengths and lower extension values; in other words, adhesives may be hard to elastic, and sealants may be elastic to plastic.

Unsaturated Polyester Resins:

Unsaturated polyester resins can be obtained by polycondensation of unsaturated and saturated dicarboxylic or polycarboxylic acids with alcohols. Given a suitable reaction regime, the double bonds remain in the acid and/or alcohol and permit reactions with unsaturated monomers, styrene for example, in accordance with the principle of addition polymerization.

Unsaturated dicarboxylic acids that can be used are as follows: maleic anhydride, maleic acid, fumaric acid.

Saturated Dicarboxylic Acids:

ortho-Phthalic acid and ortho-phthalic anhydride, isophthalic acid, terephthalic acid, tetrahydrophthalic acid, hexahydrophthalic acid, adipic acid, azelaic acid, sebacic acid, Het acid, tetrabromophthalic acid.

Glycols that can be used are as follows:

Propylene 1,2-glycol, ethylene glycol, butylene glycol, neopentyl glycol, 2,2,4-trimethylpentane-1,3-diol, dibromoneopentyl glycol, diethylene glycol, triethylene glycol, dipropylene glycol, pentaerythritol diallyl ether, dicyclopentadiene.

Monomers for the crosslinking may be:

Styrene, alpha-methylstyrene, meta- and para-methylstyrene, methyl methacrylate, diallyl phthalate, triallyl cyanurate.

This listing does not exhaust the number of possible starting materials; the skilled person will be able, depending on the raw material situation, to use other compounds as well. Furthermore, the addition of dicyclopentadiene is customary, and the reactivity of the resins is modified as a result. The "unsaturated polyester resins" produced can be used as such or in dilution with reactive monomers. Reactive monomers may be styrene, stilbene, esters of acrylic acid, esters of methacrylic acid, diallyl phthalate, and other unsaturated compounds, provided that they have a sufficiently low viscosity and adequate miscibility with the unsaturated polyester resin.

Epoxy Resins:

Epoxy resins can be prepared for example by condensing 2,2-bis(4-hydroxyphenyl)propane, also called bisphenol A, and epichlorohydrin in a basic medium. Depending on the equivalents of both reactants that are employed, the products are glycidyl ethers with different molar masses. Use may also be made of epoxy resins from bisphenol F, novolak epoxy resins, and cycloaliphatic and heterocyclic epoxy resins.

Since epoxy resins on their own are poor film formers, molecular enlargement is required by means of suitable crosslinking agents. Examples of crosslinking agents that can be used for epoxy resins include polyamines, polyaminoamides, carboxylic anhydrides and dicyandiamides. Amine curing agents that can be used include aliphatic, cycloaliphatic, aromatic and araliphatic polyamines. Curing takes place without elimination of reaction products. It generally involves the addition of a reactive hydrogen atom to the epoxide group, with formation of a hydroxyl group.

Polyurethane Resins:

The polyurethanes, also called polyisocyanate resins, derive from isocyanic acid. As an extremely reactive compound, it undergoes addition very readily with compounds which possess an active (mobile) hydrogen atom. In the course of this reaction the double bond between the nitrogen and the carbon is cleaved, the active hydrogen becoming attached to the nitrogen and the R2-O group to the carbon, to form a urethane group. In order to obtain higher molecular mass crosslinked polyurethanes of the kind needed for adhesive and sealant layers, it is necessary to provide reaction partners which are starting products having at least two functional groups, such as di- or triisocyanates, for example diphenylmethane 4,4-diisocyanate (MDI) with polymeric fractions, or reaction product of tolylene diisocyanate (TDI) and polyols, and polyhydric alcohols (diols or polyols, compounds having two or more hydroxyl functions in the molecule). Alcohols of this kind may also be present, for example, in the form of saturated polyesters, which are prepared with an excess of polyalcohols.

Two-component reactive adhesives are composed of a low molecular mass polyisocyanate and a likewise relatively low molecular mass polyesterpolyol, for example polyalkylene polyadipate. Following the combining of the two components, urethane groups are formed in the adhesive or in the adhesive layer.

One-component reactive adhesives are composed of a relatively high molecular mass polyisocyanate-polyurethane, which sets by reacting with atmospheric moisture. In principle the situation here as well is one of two inter-reacting chemical components, but only one physical component is supplied for adhesive processing. Since, on reaction with moisture, the simple low molecular mass polyisocyanates form relatively hard and brittle adhesive layers with low strength values, the one-component systems start from pre-crosslinked polymers, known as prepolymers. These compounds are prepared from relatively high molecular mass polyols with a stoichiometric excess of isocyanate. In this way, the compounds present already possess urethane bonds, but in addition possess reactive isocyanate groups as well, which are amenable to the reaction with moisture. The reaction with water proceeds with the formation of a urea bond. The primary amines formed in the course of the decomposition reaction react immediately with further isocyanate groups to form polyureas. In the case of the one-component systems, therefore, the fully cured polymer contains not only urethane compounds but also urea compounds.

Solvent-borne polyurethane adhesives are available as physically setting systems and as chemically reacting systems. In the case of the physically setting systems the polymer takes the form of a high molecular mass hydroxyl polyurethane. The solvent used is, for example, methyl ethyl ketone. The chemically reacting systems include, further to the hydroxyl polyurethane, a polyisocyanate as crosslinker and as a second component.

Dispersion-based adhesives comprise a high molecular mass polyurethane in dispersion in water.

In the case of thermally activable polyurethane adhesives the isocyanate component is in "capped" or "blocked" form in a compound which eliminates the isocyanate component only at a relatively high temperature.

Reactive polyurethane hotmelt adhesives are prepared by using relatively high molecular mass, crystallizing and meltable diol and isocyanate components. These components are applied as hotmelt adhesives at temperatures from around 70° C. to 120° C. to the adherends. After cooling (physically setting) the bond acquires a sufficient initial strength, which allows rapid further processing.

Subsequently, as a result of additional moisture exposure of the reactive isocyanate groups still present, cross-linking then takes place via urea bonds (chemical reaction), to form the adhesive layer polymer.

Silane-Terminated Polymers:

The term "silane-terminated polymers" or else "silane-modified polymers" embraces all of those prepolymers which, either at the chain ends or pendently, carry silyl groups having at least one hydrolysable bond, but whose polymer backbone does not contain the siloxane bond $(SiR_2O)n$ typical of silicones.

In general it can be assumed that any silane-modified polymer, irrespective of its chemical structure, will have the qualities of a hybrid: the curing is similar to that of the silicones, and the other properties are shaped by the various possible polymer backbones between the silyl groups. Silane-terminated or silane-modified polymers can be classed in terms of their structure between the polyurethanes and the silicones.

The synthesis of the silane-modified polymers encompasses a number of stages. The initial basis is dihydric or trihydric polyoxypropylene glycol, which is converted into the corresponding bisallyl compound. That compound is reacted to form the desired end product, bis(3-(methyldimethoxysilyl)propyl)polyoxypropylene.

The silyl groups thereby introduced into the chains crosslink via mechanisms of the kind known in silicone chemistry, i.e., with elimination of small amounts of water or methanol, and so give an elastic and insoluble network.

There are further possible methods of obtaining sealants and adhesives based on silicone-modified polymers, for example the reaction of NCO-terminated prepolymers with correspondingly reactive aminosilanes or mercaptosilanes to form the desired compounds. The polymer backbone may contain all of the conceivable, rational structural elements, such as ether, ester, thioether or disulphide bridges. The converse case, in which an $NH_2$—, SH—, or OH— terminated prepolymer can be reacted with an isocyanate silane, is likewise conceivable. The addition of terminal mercapto groups (either in the prepolymer or in the silane) to C—C double bonds offers a further route of technical interest.

Vinyl Resins:

On the chemical side, vinyl ester resins possess a certain relationship to the UP resins, in particular as far as curing reaction, processing technology and field of use are concerned. These resins are polyadducts of liquid epoxy resins and acrylic acid. As a result of reduction of ester groups in the molecule chain, these resins have better hydrolysis resistance in tandem with effective elasticity and impact toughness. Monomers used for crosslinking are the same as for the unsaturated polyester resins, styrene in particular.

Acrylates:

The collective term "acrylate-based adhesives" encompasses all of the reactive adhesives whose curing takes place via the carbon-carbon double bond of the acrylic group.

Particular significance in adhesive formulations has been acquired by the methacrylic esters and the alpha-cyanoacrylic esters. The curing of the acrylate adhesives is accomplished by addition polymerization, in the course of which an initiator triggers a chain reaction leading to a continuous concatenation of molecules (monomers) via the carbon double bond, to give the cured adhesive. The polymerization of the "acrylate" adhesives can be initiated by means of free radicals (free-radical polymerization). The polymerization may also be initiated, moreover, in the case of the alpha-cyanoacrylates, by means of anions (anionic polymerization). In accordance with the polymerization mechanism that is utilized for curing, the acrylate adhesives are also subdivided into the following groups:

anionically curing adhesives: alpha-cyanoacrylate 1-component adhesives free-radically curing adhesives: anaerobic 1-component adhesives free-radically curing adhesives: 2-component adhesives In the case of the sealants based on polyacrylic esters or acrylic ester copolymers and polymethacrylic esters a distinction is made between solvent-borne and aqueous systems. Polyacrylate sealants cure physically by evaporation of the solvent or of the dispersion water.

Polyvinyl Acetates:

Polyvinyl acetate is the product of polymerization of vinyl acetate. Owing to the strongly polar acetate group present in the molecule, polyvinyl acetate possesses very good adhesion properties to many adherend surfaces. Use is predominantly as a dispersion-based adhesive with a solids content of approximately 50% to 60%, in some cases also based on vinyl acetate copolymers (with vinyl chloride, for example).

Polyvinyl Alcohols:

Polyvinyl alcohol comes about as a product of hydrolysis of polyvinyl acetate and other similar polyesters. Depending on molecular weight, the polyvinyl alcohol takes the form of a liquid having a more or less high viscosity. It is used, for example, for bonding cellulosic materials, such as paper, cardboard, wood and the like, and also as a protective colloid for stabilizing and increasing the setting rate of dispersion-based adhesives.

Polyvinyl Ethers:

Among the polyvinyl ethers, the following three polymers in particular are preferred as base materials for adhesives:

polyvinyl methyl ethers
    polyvinyl ethyl ethers
    polyvinyl isobutyl ethers The polyvinyl ethers at moderate degrees of polymerization are tacky plasticizing resins possessed of very good adhesion properties to porous and smooth surfaces. Polyvinyl methyl ether is notable in particular for the fact that, owing to its water of solubility, it can be moistened again and therefore, for example, as a mixture with dextrin or animal glues, used as a gum on label papers, endows them with improved adhesion. On account of their permanent tackiness, polyvinyl ethers are also employed in pressure-sensitive adhesives.

Ethylene-Vinyl Acetates:

Ethylene-vinyl acetates are copolymers of ethylene and vinyl acetate. In the molecular structure the vinyl acetate molecules are incorporated randomly in the ethylene chain. While the elimination of acetic acid makes the polyvinyl acetate relatively unstable under temperature load, the copolymers with ethylene are significantly more resistant in terms of oxidation and thermal degradation. For this reason, EVA copolymers (with an approximately 40% vinyl acetate fraction) are among an important group of base hotmelt adhesive materials.

Ethylene-Acrylic Acid Copolymers:

Ethylene-acrylic acid copolymers are copolymers of ethylene and of acrylic acid and/or acrylic esters.

These copolymers, which combine the chemical resistance of polyethylene with the good properties of the acid and/or ester moiety, represent important base polymers for hotmelt adhesives. The ester component used may preferably be ethyl acrylate.

Polyvinylacetals:

Polyvinylacetals come about through the action of aldehydes on alcohols. The most important acetals for adhesives' manufacture are polyvinylformal
    polyvinylbutyral.

Both serve as a plasticizing component for phenolic resin-based adhesives; polyvinylbutyral, moreover, finds application as an adhesive film in laminated safety glass.

Polystyrene:

Polystyrene is the polymerization product of styrene.

The monomer (monostyrene) is in use as a constituent for adhesive base materials predominantly in two sectors:

as a copolymer with plasticizing monomers, particularly butadiene, for the preparation of styrene-butadiene dispersions;

as a "polymerizable" solvent for copolymerization with unsaturated polyesters.

Polyvinyl Chloride:

Polyvinyl chloride is the polymerization product of vinyl chloride.

It can be used as a base material, particularly for plastisol adhesives, and also as a copolymer with vinyl acetate to give vinyl chloride/vinyl acetate copolymers in solvent-based adhesives, dispersion-based adhesives, heat-sealing adhesives, and as a high-frequency welding assistant.

Styrene-Butadiene Rubber:

Styrene-butadiene rubber is a typical example of a thermoplastic elastomer, combining the application properties of elastomers with those of thermoplastics. The styrene-butadiene copolymer (SBS) and the styrene-isoprene copolymer (SIS) are what are called triblock copolymers, constructed linearly of successive identical monomer units in individual blocks. The end blocks are polystyrene segments, while the middle block is polybutadiene (styrene-butadiene-styrene block copolymer, SBS) or else isoprene (styrene-isoprene-styrene block polymer, SIS).

The proportion of styrene to butadiene (isoprene) fraction is approximately 1:3. Unlike adhesive layer polymers which owe their elastic properties to the addition of plasticizer, in this way an "internal plasticizing" is achieved. A particular advantage of these rubber copolymers is their ability to form adhesive layers having good adhesion properties and high flexibility. Significant application therefore exists in situations where the adhesively bonded adherends are subject in practical use to high deformation stresses, such as in footwear or with rubber/rubber or rubber/metal bonds, for example.

Chloroprene Rubber (CR):

Chloroprene rubber (polychloroprene) comes about as a polymerization product and copolymerization product of chloroprene (2-chlorobutadiene). Besides the good adhesion properties, the linear macromolecules possess a strong propensity towards crystallization, which contributes to a relatively high strength on the part of the adhesive layer. These polymers and copolymers are important base materials for contact adhesives. The double bond present within the polychloroprene molecule allows additional crosslinking to be carried out with correspondingly reactive molecule groups. Thermosetting components used for this purpose include isocyanates and phenolic resins.

In the case of polychloroprene latices the base polymers are dispersed in aqueous phase with the corresponding additives (tackifying resins, etc.) by means of suitable emulsifiers and/or protective colloids.

Nitrile Rubber (NBR):

Nitrile rubber is a copolymer of butadiene with a fraction of approximately 20% to 40% of acrylonitrile. The high acrylonitrile fraction endows these polymers with effective plasticizer resistance, so making them highly suitable, for example, for the bonding of plasticized plastics.

Butyl Rubber:

Butyl rubber is a copolymer composed of a predominant fraction (<97%) of isobutylene with isoprene (<5%). Within this linear chain molecule there exist, in the form of the long polyisobutylene segments, very high chain fractions of saturated character, at which no further crosslinking is possible. The sole crosslinkable component is the isoprene molecule, and so the overall properties of the butyl rubber are determined by the fraction of the number of double bonds, predetermined by the isoprene.

The reactivity can be further influenced by incorporation of monomers containing chlorine or bromine.

Polysulphide:

Raw materials for polysulphide sealants have long been known under the trade name Thiokol®. Polysulphide polymers are obtained by reacting dichloroethylformal with sodium polysulphide.

The molecular weight of the liquid polymers is between 3000 and 4000. By reaction with an oxidizing agent, manganese dioxide for example, they can be converted into an ultimate rubber-elastic state.

Polyethylene:

Polyethylene is prepared as the polymerization product of ethylene. The low molecular mass types, with melt indices in the range from 2 to 2000 g/10 min, have found use, in combination with tackifying resins and microwaxes, as hotmelt adhesives in the paper and cardboard industry.

Polypropylene:

Polypropylene is prepared as the polymerization product of propylene.

Polypropylene is in use as a base material for hotmelt adhesives with moderate strength properties, more specifically in the form of atactic polypropylene.

Fluorinated Hydrocarbons:

Polyfluoroethylene propylene is a copolymer of tetrafluoro-ethylene and hexafluoropropylene and has been studied as a base material for hotmelt adhesives. The advantage of these products lies in the high long-term temperature durability.

Polyamides:

The polyamides represent some of the most important base materials for the physically setting hotmelt adhesives. Suitable for the preparation of the polyamides are the reactions described below, which typically take place in the melt under a nitrogen atmosphere:
  polycondensation of diamines with dicarboxylic acids
  polycondensation of aminocarboxylic acids
  polycondensation from lactams
  polycondensation of diamines with dimerized fatty acids Saturated Polyesters and Copolyesters:

Saturated polyesters and copolyesters come about through polycondensation from dicarboxylic acids and diols. They are an important base material for hotmelt adhesives.

Phenol-Formaldehyde Resins:

These polymers come about through a polycondensation reaction between phenol and formaldehyde. Highly crosslinked phenolic resins are formed which are used as a base material for adhesives for—for example—aircraft construction. Pure phenol-formaldehyde resins are generally too brittle. For this reason they are modified with thermoplastic polymers by copolymerization or cocondensation, for example with:
  polyvinylformal
  polyvinylbutyral
  elastomers, for example polychloroprene and nitrile rubber
  polyamides
  epoxy resins Cresol-/Resorcinol-Formaldehyde Resins:

Besides phenol as a starting monomer for formaldehyde condensations, use is also made of phenol derivatives, such as cresols and resorcinol, as co-reactants.

Urea-Formaldehyde Resins:

A large number of nitrogen-containing organic compounds are capable of polycondensation with aldehydes. For application as adhesives, urea and melamine in particular have acquired importance. With the urea-formaldehyde resins the reaction sequence takes place initially in the form of an addition reaction in weakly acidic solution. The actual polycondensation reaction, leading to the formation of the polymeric adhesive layer, results in highly crosslinked polymers via the formation either of an ether bridge or of a methylene bridge.

Melamine-Formaldehyde Resins:

Like urea, melamine as well reacts with formaldehyde to form methylol compounds. As in the case of the urea reactions, the polycondensation with these compounds too proceeds via methylene or methylene ether linkages to form high molecular mass, highly crosslinked, hard and in some cases brittle adhesive layers.

Polyimides:

The experiments on the use of the polyimides arise out of the concern to have organically based adhesives available for high temperature loads.

The preparation of industrially utilizable polyimides is accomplished by reaction of the anhydrides of tetrabasic acids, for example pyromellitic anhydride, with aromatic diamines, for example diaminodiphenyl oxide. Use as an adhesive is accomplished starting from a precondensate, in the form of solutions or films.

Polybenzimidazoles:

The polybenzimidazoles are likewise to be classed as adhesives of high heat resistance. They come about through a polycondensation reaction from aromatic tetramines with dicarboxylic acids.

Polysulphones:

The polysulphones likewise belong to the group of heat-resistant adhesives. They are obtained, for example, through a polycondensation reaction from dihydroxydiphenyl sulphone with bisphenol A.

The hydrophilic fumed silica structurally modified by grinding may be a fumed silica (pyrogenically prepared silicon dioxide) characterized in that it has the following characteristic physicochemical data:

| | |
|---|---|
| BET surface area | $200 \pm 15$ m$^2$/g |
| Grindometer value | less than 30 μm |
| Median value | PCS 65 to 85 nm |

It can be prepared by grinding a fumed silica having a BET surface area of $200\pm25$ m$^2$/g.

In one preferred embodiment of the invention the grinding may take place by means of a pinned-disc mill or an air-jet mill.

The fumed silica may have an average primary particle size of 12 nm±5 nm, preferably 12 nm.

In a further embodiment of the invention, it is possible to use a fumed silica having a tamped density of approximately $50\pm10$ g/l, preferably 50 m$^2$/g.

In one particular embodiment of the invention it is possible to use a fumed silica which has the following characteristic physicochemical data:

|  |  | AEROSIL® 200 |
|---|---|---|
| Attitude to water |  | hydrophilic |
| Appearance |  | white powder |
| BET surface area[1] | m$^2$/g | 200 ± 25 |
| Average primary particle size | nm | 12 |
| Tamped density[2] | g/l | about 50 |
| Loss on drying[3] (2 h at 105° C.) on leaving supply plant | % | <=1.5 |
| Loss on ignition[4][5] (2 h at 1000° C.) | % | <=1 |
| pH[6] (in 4% aqueous dispersion) |  | 3.7-4.7 |
| SiO$_2$[7] | % | >=99.8 |
| Al$_2$O$_3$[7] | % | <=0.05 |
| Fe$_2$O$_3$[7] | % | <=0.003 |
| TiO$_2$[7] | % | <=0.03 |
| HCl[7][8] | % | <=0.025 |

[1] To DIN ISO 9277
[2] To DIN EN ISO 787-11, JIS K 5101/20 (unsieved)
[3] To DIN EN ISO 787-2, ASTM D 280, JIS K 5101/23
[4] To DIN EN 3262-20, ASTM D 1208, JIS K 5101/24
[5] Based on the substance dried at 105° C. for 2 hours
[6] To DIN EN ISO 787-9, ASTM D 1208, JIS K 5101/26
[7] Based on the substance calcined at 1000° C. for 2 hours
[8] HCl content in constituent from loss on ignition The Aerosil® 200 silica used in accordance with the invention, with a BET surface area, differs from the known Aerosil® 300, which has a surface area of 300 m$^2$/g, not only in the surface size but also in the average size of the primary particles. The Aerosil® 300 has an average primary particle size of 7 nm. On the basis of these differences, these silicas feature different performance properties.

The fumed silica used in accordance with the invention contains no hydrophobic fractions. In spite of this the silica used in accordance with the invention shows no tendency toward reagglomeration. The grindometer value is below 30.

In accordance with the invention it is surprising that the silicas described above, with an unchanged high viscosity, feature an improved, smaller grindometer value, as thixotropic agents in unsaturated polyester resins, and hence do not exhibit roughnesses of the surface.

The applications of the high-viscosity thixotropic adhesive and sealant systems of the invention are, for example, as a gelcoat in moulding construction, as adhesive resins and filling resins, and for adhesive bonds in the construction of boats, plant, wind turbines and motor vehicles.

EXAMPLES

I. Preparation of the Inventive Fumed Silica

The inventive examples were produced by metering commercial AEROSIL® 200 (bagged product) into the mill employed, using a metering balance, and subjecting it to grinding. The Aerosil® 200 has the physicochemical properties listed in Table 1.

TABLE 1

Fumed silica employed

|  |  | AEROSIL® 200 |
|---|---|---|
| Attitude to water |  | hydrophilic |
| Appearance |  | white powder |
| BET surface area[1] | m$^2$/g | 200 ± 25 |
| Average primary particle size | nm | 12 |
| Tamped density[2] | g/l | about 50 |
| Loss on drying[3] (2 h at 105° C.) on leaving supply plant | % | <=1.5 |
| Loss on ignition[4][5] (2 h at 1000° C.) | % | <=1 |
| pH[6] (in 4% aqueous dispersion) |  | 3.7-4.7 |
| SiO$_2$[7] | % | >=99.8 |
| Al$_2$O$_3$[7] | % | <=0.05 |
| Fe$_2$O$_3$[7] | % | <=0.003 |
| TiO$_2$[7] | % | <=0.03 |
| HCl[7][8] | % | <=0.025 |

[1] To DIN ISO 9277
[2] To DIN EN ISO 787-11, JIS K 5101/20 (unsieved)
[3] To DIN EN ISO 787-2, ASTM D 280, JIS K 5101/23
[4] To DIN EN 3262-20, ASTM D 1208, JIS K 5101/24
[5] Based on the substance dried at 105° C. for 2 hours
[6] To DIN EN ISO 787-9, ASTM D 1208, JIS K 5101/26
[7] Based on the substance calcined at 1000° C. for 2 hours
[8] HCl content in constituent from loss on ignition The experiments were carried out using a pinned-disc mill (Alpine 160Z, rotor diameter 160 mm) or an air-jet mill (grinding chamber diameter: 240 mm, grinding chamber height: 35 mm). The individual parameters of preparation are listed in Table 2.

The ground product was isolated with a hose filter (filter area: 3.6 m$^2$, filter material: woven nylon fabric). In further experiments the ground product obtained was packaged into commercially customary bags using a commercially customary bagging machine.

In further experiments the bags packed with ground product were levelled prior to palletization, using a method routine in the industry and suitable for the purpose.

TABLE 2

Preparation of inventive silica

| Designation | Mill* | GA** quantity [m$^3$] | GA** pressure [bar] | IA*** quantity [m$^3$] | IA*** pressure [bar] | Metering [kg/h] | Bagging | Levelling |
|---|---|---|---|---|---|---|---|---|
| Example 1 | AJ | 11.8 | 1.0 | 6.8 | 1.2 | 10 | no | no |
| Example 2 | AJ | 11.8 | 1.0 | 6.8 | 1.2 | 10 | yes | no |
| Example 3 | AJ | 11.8 | 1.0 | 6.8 | 1.2 | 10 | yes | yes |
| Example 4 | AJ | 27.3 | 3.5 | 15.8 | 3.7 | 10 | no | no |
| Example 5 | AJ | 27.3 | 3.5 | 15.8 | 3.7 | 10 | yes | no |
| Example 6 | AJ | 27.3 | 3.5 | 15.8 | 3.7 | 10 | yes | yes |

TABLE 2-continued

Preparation of inventive silica

| Designation | Mill* | GA** quantity [m³] | GA** pressure [bar] | IA*** quantity [m³] | IA*** pressure [bar] | Metering [kg/h] | Bagging | Levelling |
|---|---|---|---|---|---|---|---|---|
| Example 7 | PD | — | — | — | — | 10 | no | no |
| Example 8 | PD | — | — | — | — | 10 | yes | no |
| Example 9 | PD | — | — | — | — | 10 | yes | yes |
| Example 10 | PD | — | — | — | — | 20 | no | no |
| Example 11 | PD | — | — | — | — | 20 | yes | no |

AJ* = Air-jet mill
PD = Pinned-disc mill
GA** = Grinding air
IA*** = Injector air

TABLE 3

Physicochemical data of the inventively prepared silicas

| Designation | BET specific surface area [m²/g] | pH | Tamped density [g/l] | Grindometer value [µm] | Median value by PCS [nm] |
|---|---|---|---|---|---|
| Comparative Example 1 | 197 | 4.1 | 46 | 40 | 86 |
| Example 1 | 197 | 4.1 | 24 | 25 | 74 |
| Example 2 | 198 | 4.1 | 48 | 25 | 65 |
| Example 3 | 199 | 4.1 | 62 | 30 | 72 |
| Example 4 | 200 | 4.1 | 22 | 23 | 68 |
| Example 5 | 200 | 4.1 | 41 | <20 | 73 |
| Example 6 | 199 | 4.1 | 63 | 25 | 75 |
| Example 7 | 197 | 4.1 | 21 | 30 | 73 |
| Example 8 | 198 | 4.1 | 47 | 20 | 65 |
| Example 9 | 198 | 4.2 | 52 | 20 | 71 |
| Example 10 | 199 | 4.1 | 18 | 25 | 75 |
| Example 11 | 198 | 4.1 | 49 | 25 | 65 |

With virtually the same specific surface areas in the range from 195 to 202 m²/g, preferably from 198 to 200 m²/g, and unchanged pH values, the silicas of the invention exhibit lower grindometer values and smaller median values than the starting silica.

Surprisingly the lower grindometer values and lower median values are retained in spite of the compaction, evident through the tamped density, as a result of bagging or bagging/levelling.

In some cases the tamped densities are in fact above that of the oxide used. This means that the oxides of the invention, despite the same or even higher compaction, exhibit lower grindometer values and lower median values.

TABLE 4

Particle size determination by evaluation of TEM micrographs

| Designation | DN [nm] | DA [nm] | DV [nm] | D50 (N) [nm] | D50 (g) [nm] | Total span [nm] |
|---|---|---|---|---|---|---|
| Comparative example | 13.838 | 17.513 | 22.372 | 13.043 | 15.010 | 6.180-45.740 |
| Example 1 | 11.528 | 12.536 | 13.086 | 11.013 | 12.473 | 5.260-25.500 |
| Example 4 | 12.467 | 13.436 | 13.873 | 12.302 | 13.278 | 5.260-22.740 |
| Example 5 | 13.517 | 17.150 | 21.747 | 13.111 | 14.713 | 6.180-45.740 |
| Example 8 | 12.551 | 14.147 | 15.429 | 11.684 | 13.173 | 6.180-34.700 |
| Example 9 | 12.503 | 20.450 | 28.401 | 11.195 | 35.586 | 5.260-45.740 |
| Example 10 | 13.240 | 14.242 | 14.990 | 12.565 | 13.657 | 7.100-42.060 |

DN = Particle diameter, arithmetic mean
DA = Particle diameter, averaged over surface area
DV = Particle diameter, averaged over volume
D50 (N) = Median value, number distribution
D50 (g) = Median value, weight distribution The inventive fumed silica can have a D50 (g) (i.e. median value, weight distribution) of 12 to 14 nm, preferably of 12.473 to 13.278 nm. The total span of the particles can be from 5.260 to 34.700 nm, preferably 5.260 to 22.740 nm.

FIGS. 1 to 4 show that the inventive silica has no particles in the range greater than 40 nm when the weight distribution is considered (cf. FIG. 4).

The arithmetic mean of the particle diameter, DN, can be from 11.5 to 13.5 nm for the inventive silica.

The particle diameter averaged over the surface area, DA, can be 12.5 to 17.2 nm.

The particle diameter averaged over the volume, DV, can be 13.0 to 21.7 nm.

The median value D50 (A) (number distribution) can be 11.0 to 11.7 nm.

Determination of Characteristic Physicochemical Data BET Surface Area

The BET surface area is determined in accordance with DIN ISO 9277.

Tamped Density

The tamped density is determined in accordance with DIN EN ISO 787-11.

Principles of Tamped Density Determination:

The tamped density (formerly tamped volume) is equal to the ratio of the mass to the volume of a powder after tamping in the tamping volumeter under defined conditions. According to DIN EN ISO 787-11 the tamped density is reported in $g/cm^3$. Owing to the very low tamped density of the oxides, however, we state the value in g/l.

Furthermore, the drying and sieving, and the repetition of the tamping process, are omitted.

Apparatus for Tamped Density Determination:
Tamping volumeter
Measuring cylinder
Laboratory balance (reading accuracy 0.01 g)
Tamped Density Determination Procedure:

200±10 ml of oxide are introduced into the measuring cylinder of the tamping volumeter so that there are no cavities remaining and so that the surface is horizontal.

The mass of the sample introduced is determined to an accuracy of 0.01 g. The measuring cylinder containing the sample is inserted into the cylinder holder of the tamping volumeter and tamped 1250 times.

The volume of the tamped oxide is read off to an accuracy of 1 ml.

Evaluation of Tamped Density Determination:

$$\text{Tamped density (g/l)} = \frac{\text{g initial mass} \times 1000}{\text{ml volume read off}}$$

pH

The pH is determined in 4% aqueous dispersion.
Reagents for pH Determination:
Distilled or deionized water, pH>5.5
Buffer solutions pH 7.00 pH 4.66
Apparatus for pH Determination:
Laboratory balance (reading accuracy 0.1 g)
Glass beaker, 250 ml
Magnetic stirrer
Magnetic rod, length 4 cm
Combined pH electrode
pH meter
Dispensette, 100 ml
Procedure for Determining pH:

The determination takes place in a modification of DIN/ISO 787/IX.

Calibration: Prior to pH measurement the meter is calibrated using the buffer solutions. Where two or more measurements are carried out one after another, a single calibration is sufficient.

4 g of oxide are mixed in a 250 ml glass beaker with 96 g (96 ml) of water, with the aid of a dispensette, and the mixture is stirred using a magnetic stirrer (speed about 1000 $min^{-1}$) for five minutes with the pH electrode immersed.

After the stirrer has been switched off the pH is read off after a standing time of one minute. The result is reported to one decimal place.

Grindometer Value

Principles:

The degree of dispersion determines the performance properties of the liquid thickened with Aerosil. The measurement of the grindometer value serves to assess the degree of dispersion. By the grindometer value is meant the boundary layer thickness below which the bits or aggregates present become visible on the surface of the sample which has been coated out.

The sample is coated out in a groove with a scraper, the depth of the groove at one end being twice the size of the diameter of the largest Aerosil particles, and decreasing steadily down to 0 at the other end. On a scale indicating the depth of the groove, the depth value is read off, in micrometers, the value in question being that below which a relatively large number of Aerosil particles becomes visible as a result of bits or scratches on the surface of the binder system. The value read off is the grindometer value of the system present.

Apparatus and Reagents:

Hegmann grindometer with a depth range of 100-0 micrometer. Polyester resin dispersion with 2% Aerosil, prepared according to Testing Instructions 0380.

The testing instructions run as follows:
Apparatus and Reagents:
Dispermat AE02-C1, VMA-Getzmann (dispersing disc, diameter 5 cm)
Plastic beaker, 350 ml, external diameter 8.4 cm
plastic lid to fit
Monostyrene solution (100 g monostyrene+0.4 g paraffin)
Palatal® P6-01, DSM composite resins
Centrifuge, Jouan GmbH
Thermal-conditioning cabinet
Procedure:

142.5 g of Palatal® are weighed out into a plastic beaker and 7.5 g of Aerosil are weighed in; subsequently the Aerosil is stirred carefully into the Palatal using the Dispermat at about 1000 $min^{-1}$ (any residues of Aerosil adhering to the beaker walls are brushed into the beaker with the Dispermat switched off) and then dispersed for 5 minutes at 3000 $min^{-1}$ (the distance of the dispersing disc from the bottom of the beaker being approximately 1 mm); the beaker is covered during this procedure with a lid including a drilled hole.

In a further plastic beaker, 60 g of the dispersion and 27 g of monostyrene solution are introduced, with 63 g of Palatal® P6, and dispersion is carried out using the Dispermat at 1500 $min^{-1}$ for 3 minutes (beaker covered).

This results in a concentration of 2% Aerosil in the final mixture, which contains 18% monostyrene.

In order to remove air bubbles, the plastic beaker, sealed, is centrifuged in a laboratory centrifuge at 2500 $min^{-1}$ for 2.5 minutes. The dispersion is left standing in the covered beaker in a thermal-conditioning cabinet at 22° C. for 1 hour and 50 minutes.

Procedure:

The grindometer block is placed on a flat, slip-proof surface and is wiped clean immediately prior to testing. The Aerosil dispersion, which must be free from air bubbles, is then applied to the deepest point of the groove in such a way that it flows off somewhat over the edge of the groove. The scraper is then held by both hands and placed, perpendicularly to the grindometer block and at right angles to its longitudinal edges, with gentle pressure, onto the end of the groove in which the dispersion is located. The dispersion is then coated out in the groove by slow, uniform drawing of the scraper over the block. The grindometer value is read off no later than 3 seconds after the dispersion has been coated out.

The surface of the spread dispersion (transverse to the groove) is viewed obliquely from above at an angle of 20-30° (to the surface). The block is held to the light in such a way that the surface structure of the spread dispersion is readily apparent.

The grindometer value read off on the scale is the value in micrometers below which a relatively large number of Aerosil particles become visible as bits or scratches on the surface. Individual bits or scratches occurring randomly are not taken into account in this context.

The granularity is assessed at least twice, in each case on a newly spread dispersion.

Evaluation:

From the measured values the arithmetic mean is formed.

The relationship between the grindometer value in micrometers and the FSPT units and Hegmann units, which are based on the inch system, is as follows:

$$B = 8 - 0.079A$$

$$C = 10 - 0.098A = 1.25B$$

In this relationship:
A=Grindometer value in micrometers
B=Grindometer value in Hegmann units
C=Grindometer value in FSPT units
Particle Size Determination by Means of PCS
Purpose:

The method of analysis described below is used to determine the particle size distribution by means of photon correlation spectroscopy (PCS, dynamic light scattering) of the dispersed phase (mostly solid particles) in dispersions. This method is particularly suitable for determining particles and their aggregates whose size lies within the submicrometer range (10 nm to 3 μm).

General Remarks, Theory:

The basis for particle size determination by means of PCS is the Stokes-Einstein equation, which demonstrates the relationship between particle size (expressed through the so-called hydrodynamic diameter d(H)) and the diffusion coefficient D of the particles:

$$d(H) = kT/3\eta \cdot \Pi D$$

Clearly this equation can be derived via an equilibrium of forces between the Brownian motion of the particles and the opposing flow resistance. From this equation it is also comfortably apparent which parameters must be known or constant: the viscosity $\eta$ of the dispersing medium, and the temperature T. If this is ensured, the hydrodynamic diameter can be calculated via the determination of the diffusion coefficient. Expressed in other terms: large particles move slowly, small ones quickly.

The movement of the particles in a dispersion can be monitored via the fluctuation in the scattered-light intensity of a laser beam. Where rapid movements are present, the fluctuation in intensity is small; slower particles generate more considerable fluctuations. By way of mathematical operations such as a Fourier transformation or an autocorrelation function, it is possible, from the fluctuation pattern of the scattered-light signal, which is constant on average, to infer a particle distribution.

In the simplest case, a monodisperse distribution is assumed. If the logarithm of the autocorrelation function is then plotted against the correlation time, the average diffusion constant is given by the slope of the best-fit line. This form of evaluation is known as "cumulant analysis". In reality this relationship is usually non-linear, since the distributions present are not actually monodisperse. As a measure of the breadth of distribution the polydispersity index "PI" is defined, by adapting a third-degree polynomial rather than a straight line. The "PI" is then PI=2c/b2 where b and c are the coefficients of second and third degree.

In order to determine volume-weighted or mass-weighted averages, however, it is necessary to consider the Mie theory (comprehensive scattered-light theory), which presupposes a knowledge of the refractive indices of particle and dispersion medium. In order to gain even more information from the intensity fluctuations, it is possible mathematically to adapt distributions other than, for example, one (or more) log-normal distribution(s). An established method of achieving this is the so-called "Contin" analysis, which encompasses lop-sided and also multimodal distributions.

Since the definition of the hydrodynamic diameter derives from the assumption of spherical form of the particles, the measurement result obtained must always be understood, in the case of non-spherical particles, as an equivalent spherical diameter. This means that the diameter assumed is that of a sphere which causes the same intensity fluctuations as the non-spherical particles under determination. Only indirectly, therefore, does the hydrodynamic diameter have anything to do with an "actual size".

Measurement Prerequisites, Restrictions:

The structure of the scattered-light geometry of different instruments gives rise to technical restrictions on the measurement. The conventional PCS instrument, such as the Malvern Zetasizer 3000 instrument used here, uses a scattered-light angle of 90°. In order to rule out multiple scattering, which would falsify the result, the sample under measurement must with this geometry be highly diluted. Indicative values are a concentration of 0.0010-0.01% by weight. Obviously the dispersions under measurement ought to be translucent and to have only a slight turbidity.

Other geometries also permit the use of higher concentrations. Hence depending on particle type (particle density, morphology) it is possible to carry out measurement even of concentrations from 0.5% to 30% by weight. For this purpose, for example, the Horiba LB 500 instrument uses a back-scattering optical system for which the ratio between single and multiple scattering is virtually constant and can therefore be disregarded. In the case of the alternative 3D cross-correlation technique it is possible to eliminate the fraction of multiply scattered light mathematically through the use of two independent laser beams. Where high concentrations are used, however, there is a further restriction to be observed: the determination of the diffusion constant presupposes the free mobility of the particles, which at high concentrations is no longer the case. For this reason, with instruments which allow the use of higher concentrations, dilution series ought to be routinely measured.

Determining the particle size distribution by means of PCS requires knowledge of the following physical parameters:

Temperature of the Dispersion

In the case of the Zetasizer 3000 the sample holder is thermally conditioned by way of a Peltier element (25° C.), and the temperature is held constant during the measurement. This is important in order to rule out convection movement within the cell, which would super-impose itself on the free movement of the particles. The Horiba LB500 measures the temperature in the cell and takes account of the temperature it measures in the context of the evaluation.

Viscosity of the Dispersion Medium

In the case of the highly diluted systems this is not critical, since in that case the viscosities of the pure solvents at 25° C., for example, are well known. It is necessary, however, to ensure that the right viscosity is used for the calculation.

Refractive Index of Particles and Dispersion Medium

These figures are needed only for the volume-weighted evaluation. For determining a cumulant analysis (zave, PI) these details are unimportant. For standard systems there are tabular values (see instrument handbook); in the case for example of surface-modified substances, however, one ought to be aware of this possible source of error if the refractive index is not known with precision, and in that case only the cumulant analysis ought to be used.

Furthermore, the following preconditions must be met:

The dispersion must be stable to sedimentation. Sedimentation in the cell not only generates additional movement in the particles (see above) but also alters the scattered-light intensity during measurement. Moreover, it depletes the dispersion of larger particles, which collect on the bottom of the cell. For this reason the scattered-light intensity should be monitored during the measurement ("count rate"). If this count rate is not stable, the result ought not to be interpreted. This restriction is the reason why the upper measurement limit for PCS is dependent on the difference in density between particle and dispersion medium.

To dilute the dispersion to measurement concentration it is necessary to use extremely clean, dust-free solvent (generally water). This is particularly important for the measurement of small particles and also in highly dilute dispersions.

Apparatus:

Malvern Zetasizer 3000 HSa instrument

Disposable cells 10×10×48 mm (e.g. Sarstedt Ref. 67.754) for aqueous dispersions or glass cells 10×10×48 mm for solvent-containing dispersions.

Glass beaker

Syringe (20 ml)

Disposable filter 200 μm (for example Macherey-Nagel Chromafil A-20/25, cellulose mixed ester)

Disposable pipettes

Software, settings

The Malvern Zetasizer 3000 HSa instrument is controlled via a computer program which also carries out the evaluation of the measurement signal and allows the results to be archived and printed out. As regards the operation of the program, reference should be made at this point to the handbook.

Prior to each measurement it is necessary to perform the following settings within the software:

Input of the refractive indices of particle and medium (see above)

Input of the viscosity of the dispersion medium (see above)

Designation and notes relating to the sample

Path and file for archiving of the result

In addition the following settings are present as standard and are generally not changed:

10 measurements are collated to form one series and their average is expressed as the result.

3 such measurements are carried out per sample.

There is a waiting time of 1 minute before each measurement (for constant temperature).

Attenuator "Auto" (instrument automatically attenuates the signal intensity down to a factor of 128, so that it is not necessary to prepare the sample with such precision).

Data Analysis "Contin"

Other settings: dilation 1.20; weighting "quadratic"; size range "Auto"; point select "Auto", by cut off 0.01; optical properties 0.00, core real 1.6, core imag. 0; Mark-Houwink parameters A 0.5 cm2/s, K 0.000138.

Procedure:

Sample Preparation:

20 ml of pure solvent (generally fully demineralized water) are filtered, using a syringe, through a 200 μm filter and then introduced into a clean, dust-free glass beaker. If the dispersion under measurement has been made acidic or basic, fully demineralized water adjusted accordingly is used, in order to prevent a pH shock when the dispersion is diluted. Then one drop of the dispersion is added, using a disposable pipette, to the solvent, and the glass beaker is swirled gently for some time until the drop has dispersed homogeneously, and a slight turbid solution has formed. This solution is introduced using a second disposable pipette into the cell, which is sealed and fixed in the instrument's cell holder.

Instrument Preparation

The instrument and also the attached computer are switched on and the associated measurement program is started. After the instrument has been switched on it is necessary to wait a while, since the laser and Peltier element must first come up to operating temperature. Generally, therefore, the instrument is switched off only in cases of prolonged standstill (several days).

Measurement and Evaluation:

At the beginning of the measurement it is necessary first of all to input the sample parameters and sample designation and also to select the file in which the measurements are to be stored. The actual measurements are started by clicking on the "Go" button. The results of the three measurements are subsequently compared. When there is a good match one of the measurements is selected and represented as a volume-weighted distribution by selection of the menu item "View->New plot->Volume". Selecting "Copy->Table as Text" transfers the result via the Clipboard to Excel, where it is converted, using a macro, into a report file (XLS). The Excel file generated in this way is stored on the server.

If the values of the individual measurements do not match, a repeat measurement is carried out. If it is apparent that during the measurements there are sharp fluctuations occurring in the count rate, the result is not evaluated and the particle size measurement is carried out, where appropriate, by a different method.

A. Preparing a Mixture of Unsaturated Polyester Resins with Silica Filler

Using the operating instructions described herein, mixtures of hydrophilic AEROSIL® grades and unsaturated polyester resins are prepared in order to characterize the granularity and the thickening power of the silicas.

| Formulation | |
|---|---|
| 98% | Palatal A 410 (from BÜFA) |
| 2% | silica (e.g. AEROSIL ® 200) |

205.8 g of Palatal A 410 and 4.2 g of silica are weighed out into a PE beaker and the dissolver disc is fully immersed. Then the silica is homogenized (incorporated) at a speed $n1=1000$ $\text{min}^{-1}$ with the lid closed. As soon as the silica has been fully incorporated the speed is increased to $n2=3000$ $\text{min}^{-1}$ and dispersion is carried out for 5 minutes. Subsequently the mixture is deaerated in a vacuum cabinet and stored in a waterbath at 25° C. for at least 90 minutes.

B. Measuring the Viscosity and Thixotropic Index of Various Resins with Silica Filler Resins (e.g. polyester resin, UP resin, vinyl ester resin) generally contain fillers for the purpose of improving the performance properties. Depending on the field of use, the nature and concentration of the filler used influence the rheological behaviour of the resin. A Brookfield DV III rheometer is used. Using a spatula, the mixture is homogenized in its storage vessel for 1 minute. In the course of this homogenization no bubbles ought to form. Subsequently the mixture is introduced into a 180 ml beaker until the beaker is almost full. Without delay, the measuring head of the rheometer is immersed fully into the mixture, and measurement takes place as follows:

| 5 rpm | value read off after | 60 s |
|---|---|---|
| 50 rpm | value read off after | 30 s |

The values read off are the viscosities [Pa*s] at the respective rpm.

Thixotropic Index

The thixotropic index TI is calculated by dividing the viscosity values obtained at 5 rpm and 50 rpm:

$$TI = \frac{5 \cdot \text{rpm}}{50 \cdot \text{rpm}}$$

C. Determining the Grindometer Value to DIN 53 203

Test Apparatus

A Hegmann grindometer block is used.

Measuring Procedure

The grindometer block is placed on a flat, slip-proof surface and is wiped clean immediately prior to testing. A bubble-free sample is then introduced at the deepest point of the groove in such a way that it flows off somewhat over the edge of the groove. The scraper is then held by both hands and placed, perpendicularly to the grindometer block and at right angles to its longitudinal edge, with gentle pressure, onto the low end of the groove. The sample is then coated out in the groove by slow, uniform drawing of the scraper over the block. The granularity is read off no later than 3 seconds after the sample has been scraped.

The surface of the sample is viewed obliquely from above (at an angle of 20-30° to the surface) transversely to the groove. The block is held to the light in such a way that the surface structure of the sample is readily apparent.

The value found as granularity on the scale is the figure in micrometers below which a relatively large number of silica grains become visible as bits or scratches on the surface. Individual bits or scratches occurring randomly are not taken into account in this context.

EXAMPLES

In accordance with methods A, B and C, the silicas are incorporated in the unsaturated polyester resin, and the viscosity (Table 5) and grindometer value (Table 6) are ascertained.

TABLE 5

| | Sp. No. | Viscosity (mPa s) | | |
|---|---|---|---|---|
| | | 5 rpm | 50 rpm | T.I. |
| Example 1 | 5 | 18 960 | 5696 | 3.33 |
| Example 2 | 5 | 18 400 | 5656 | 3.25 |
| Example 3 | 5 | 17 680 | 5512 | 3.21 |
| Example 4 | 5 | 17 200 | 5368 | 3.20 |
| Example 5 | 5 | 16 800 | 5326 | 3.15 |
| Example 6 | 5 | 16 480 | 5320 | 3.10 |
| Example 7 | 5 | 18 480 | 5760 | 3.21 |
| Example 8 | 5 | 17 280 | 5520 | 3.13 |
| Example 9 | 5 | 17 520 | 5472 | 3.20 |
| Example 10 | 5 | 17 600 | 5160 | 3.41 |
| Example 11 | 5 | 17 040 | 5016 | 3.40 |
| Comparative Example 1 | 5 | 20 160 | 5984 | 3.37 |

TABLE 6

| Designation | Grindometer value in μm |
|---|---|
| Example 1 | 35 |
| Example 2 | 40 |
| Example 3 | 34 |
| Example 4 | 16 |
| Example 5 | 15 |
| Example 6 | 13 |
| Example 7 | 29 |
| Example 8 | 37 |
| Example 9 | 30 |
| Example 10 | 36 |
| Example 11 | 37 |
| Comparative Example 1 | 63 |

Surprisingly, with a virtually constant thixotropic index, the inventive examples exhibit significantly lower grindometer values and hence no roughnesses of the surface, despite the high level of compaction from bagging/levelling, that is apparent from the tamped density. In some cases the tamped densities are even more than that of the comparative example.

The invention claimed is:

1. A composition comprising:
   an adhesive; and
   0.5-15 wt. % of a structurally modified hydrophilic fumed silica, which does not comprise a hydrophobic fraction, is structurally modified by grinding, and has a BET surface area of 200 $m^2/g$ ±15 $m^2/g$, a grindometer value less than 30 μm, and a median value by photon correlation spectroscopy (PCS) of 65-85 nm,
   wherein the composition does not comprise a silicone rubber.

2. The composition according to claim 1, further comprising an unsaturated polyester resin, an epoxy resin, polyurethane, a silane-terminated polymer, a vinyl ester resin, an acrylate, polyvinyl acetate, polyvinyl alcohol, a polyvinyl ether, ethylene-vinyl acetate, an ethylene-acrylic acid copolymer, polystyrene, polyvinyl chloride, styrene-butadiene rubber, chloroprene rubber, nitrile rubber, butyl rubber, polysulfide, polyethylene, polypropylene, a fluorinated hydrocarbon, a polyamide, a saturated polyester, a saturated copolyester, a phenol-formaldehyde resin, a cresol-/resorcinol-formaldehyde resin, a urea-formaldehyde resin, a melamine-formaldehyde resin, a polyimide, a polybenzimidazole or a polysulphone.

3. The composition according to claim 1, further comprising an unsaturated polyester resin.

4. The composition according to claim 1, further comprising an unsaturated polyester resin based on orthophthalic acid, or orthophthalic anhydride, and one or more glycols.

5. The composition according to claim 1, further comprising an unsaturated polyester resin based on isophthalic acid and neopentyl glycol.

6. A composition comprising:
   a sealant; and
   0.5-15 wt. % of a structurally modified hydrophilic fumed silica, which does not comprise a hydrophobic fraction, is structurally modified by grinding, and has a BET surface area of 200 $m^2/g$ ±15 $m^2/g$, a grindometer value less than 30 µm, and a median value by photon correlation spectroscopy (PCS) of 65-85 nm,
   wherein the composition does not comprise a silicone rubber.

7. The composition according to claim 6, further comprising an unsaturated polyester resin, an epoxy resin, polyurethane, a silane-terminated polymer, a vinyl ester resin, an acrylate, polyvinyl acetate, polyvinyl alcohol, a polyvinyl ether, ethylene-vinyl acetate, an ethylene-acrylic acid copolymer, polystyrene, polyvinyl chloride, styrene-butadiene rubber, chloroprene rubber, nitrile rubber, butyl rubber, polysulfide, polyethylene, polypropylene, a fluorinated hydrocarbon, a polyamide, a saturated polyester, a saturated copolyester, a phenol-formaldehyde resin, a cresol-/resorcinol-formaldehyde resin, a urea-formaldehyde resin, a melamine-formaldehyde resin, a polyimide, a polybenzimidazole or a polysulphone.

8. The composition according to claim 6, further comprising an unsaturated polyester resin.

9. The composition according to claim 6, further comprising an unsaturated polyester resin based on orthophthalic acid, or orthophthalic anhydride, and one or more glycols.

10. The composition according to claim 6, further comprising an unsaturated polyester resin based on isophthalic acid and neopentyl glycol.

11. A composition comprising:
    an adhesive;
    a sealant; and
    0.5-15 wt. % of a structurally modified hydrophilic fumed silica, which does not comprise a hydrophobic fraction, is structurally modified by grinding, and has a BET surface area of 200 $m^2/g$ ±15 $m^2/g$, a grindometer value less than 30 µm, and a median value by photon correlation spectroscopy (PCS) of 65-85 nm,
    wherein the composition does not comprise a silicone rubber.

12. The composition according to claim 11, further comprising an unsaturated polyester resin, an epoxy resin, polyurethane, a silane-terminated polymer, a vinyl ester resin, an acrylate, polyvinyl acetate, polyvinyl alcohol, a polyvinyl ether, ethylene-vinyl acetate, an ethylene-acrylic acid copolymer, polystyrene, polyvinyl chloride, styrene-butadiene rubber, chloroprene rubber, nitrile rubber, butyl rubber, polysulfide, polyethylene, polypropylene, a fluorinated hydrocarbon, a polyamide, a saturated polyester, a saturated copolyester, a phenol-formaldehyde resin, a cresol-/resorcinol-formaldehyde resin, a urea-formaldehyde resin, a melamine-formaldehyde resin, a polyimide, a polybenzimidazole or a polysulphone.

13. The composition according to claim 11, further comprising an unsaturated polyester resin.

14. The composition according to claim 11, further comprising an unsaturated polyester resin based on orthophthalic acid, or orthophthalic anhydride, and one or more glycols.

15. The composition according to claim 11, further comprising an unsaturated polyester resin based on isophthalic acid and neopentyl glycol.

* * * * *